Figure 1:
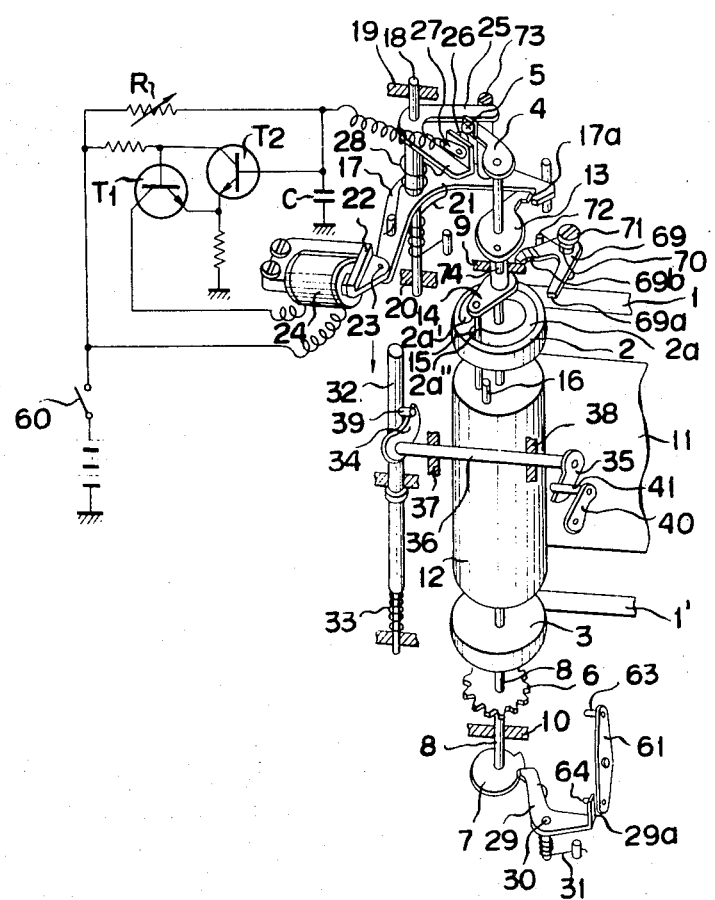

United States Patent
Ono

[15] 3,683,776
[45] Aug. 15, 1972

[54] ELECTRONIC SHUTTER SWITCH MEANS RESPONSIVE TO THE MOVEMENT OF A MIRROR DRIVING MEMBER IN A SINGLE LENS REFLEX CAMERA

[72] Inventor: Shigeo Ono, Yokohama-shi, Japan
[73] Assignee: Nippon Kogaku K.K., Tokyo, Japan
[22] Filed: Oct. 28, 1968
[21] Appl. No.: 771,175

[30] Foreign Application Priority Data

Oct. 31, 1967  Japan ............... 42/91655

[52] U.S. Cl. .................................. 95/42, 95/53 E
[51] Int. Cl. .................. G03b 19/12, G03b 9/08
[58] Field of Search ........................ 95/42, 53 E

[56] References Cited

UNITED STATES PATENTS

| | | |
|---|---|---|
| 3,349,678 | 10/1967 | Suzuki et al. ............... 95/10 |
| 3,303,766 | 2/1967 | Karikawa et al. .......... 95/42 X |
| 3,487,759 | 1/1970 | Fahlenberg .................. 95/42 |

Primary Examiner—Joseph F. Peters
Assistant Examiner—Richard L. Moses
Attorney—Harry G. Shapiro

[57] ABSTRACT

A timing circuit is employed for the shutter in a reflex camera having a retractable mirror. A switch for energizing the timing circuit is disposed in the path of movement of a driving member which actuates the shutter and is engageable with a driving mechanism for raising the mirror to photo-taking position and retracting the mirror into viewing position. When the driving member is positioned to place the mirror in the viewing position, the switch is open. When the driving member begins movement to place the mirror in the photo-taking position, the driving member acts to close the switch. The timing circuit, including an electromagnet, is energized when the switch is closed in response to the release of the shutter to the open position. The timing circuit maintains the electromagnet in energized condition for a predetermined time, after which the shutter is released.

3 Claims, 4 Drawing Figures

INVENTOR.
SHIGEO ONO

INVENTOR.
SHIGEO ONO
BY
Harry G. Shapiro
ATTORNEY

3,683,776

ELECTRONIC SHUTTER SWITCH MEANS RESPONSIVE TO THE MOVEMENT OF A MIRROR DRIVING MEMBER IN A SINGLE LENS REFLEX CAMERA

The invention relates to an improved reflex type camera, and is more particularly directed to improvements in a shutter actuating device for a single lens reflex camera.

An electromagnet generally is used to convert an electric signal into a mechanical movement for actuating a shutter for control of the exposure time by converting the charging of a condenser and by controlling the current for the charging of the condenser.

In known devices, the switch for operating the circuit which includes an electromagnet energizes the electromagnet when the switch is closed, the switch being interlocked or related to the shutter release button. When an exposure is made at a slow shutter speed, the supply of current to the electromagnet is cut off, and the shutter is closed when manual pressure upon the release button is removed. When the release button is slowly pressed, the time that the electromagnet is energized before the shutter operates becomes longer; the electric power continues to be supplied to the timing circuit while the release button is pressed and after the completion of the shutter's operation, and as a result, there is a loss of electric power or undue deterioration of the battery.

The object of this invention is to provide a switch means for an electronic shutter in a single lens reflex camera which is so arranged that, regardless of the position of the movable reflecting mirror either on the light path of a camera lens or out of the light path, the switch cooperates with a driving member for driving the mirror and the switch is closed prior to the opening operation of the shutter starts and is opened after the closing operation of the shutter starts.

Figure 2:
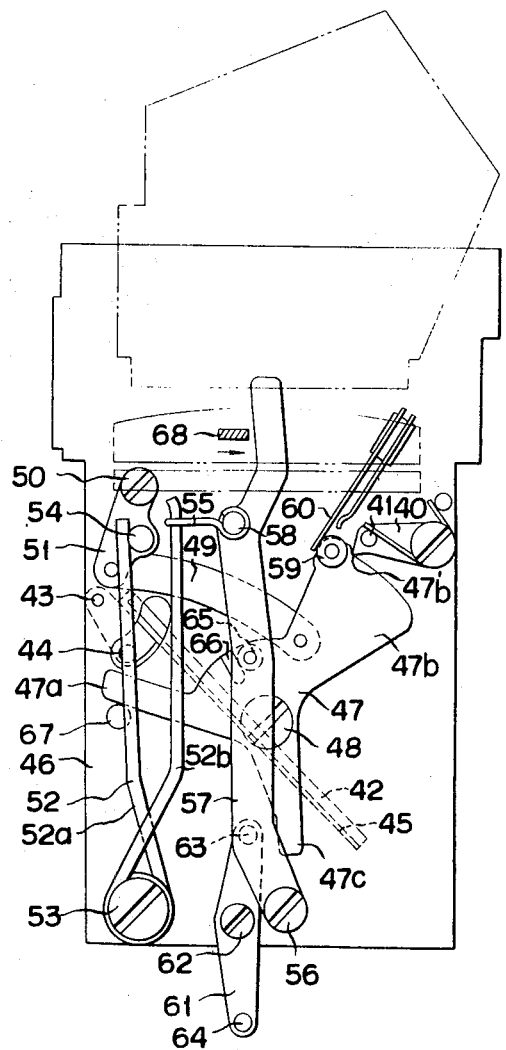
Figure 3:
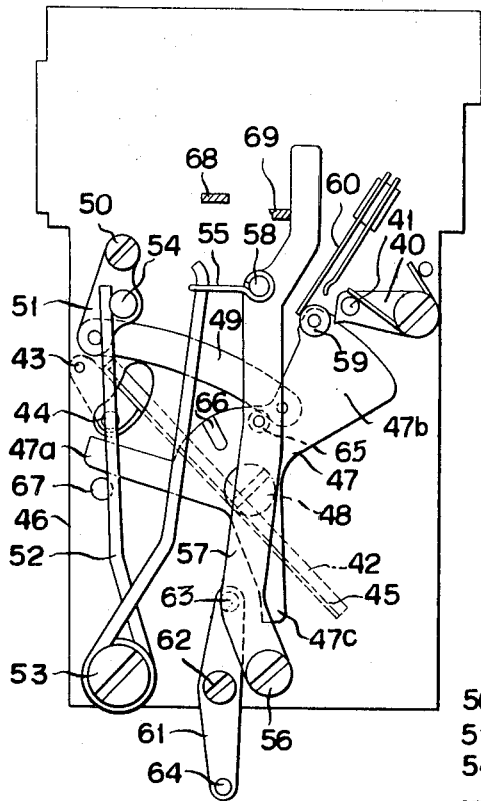
Figure 4:
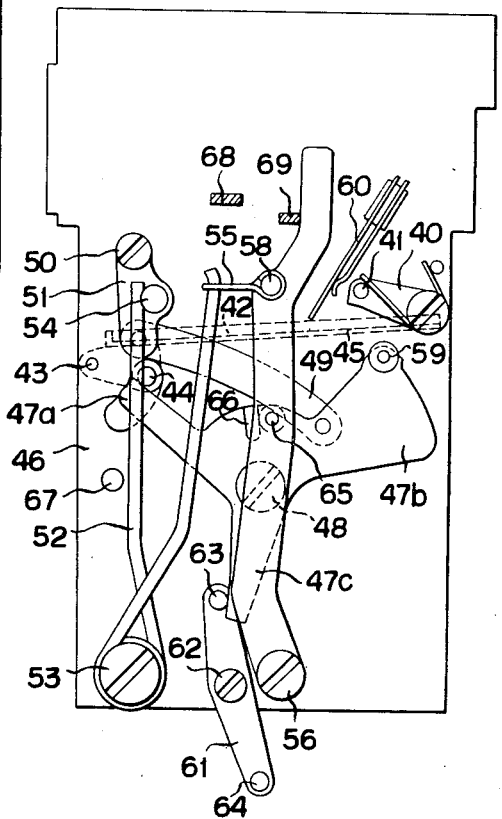

The present invention will be more apparent from the following detailed description of an embodiment of the invention with reference to the accompanying drawings, in which:

FIG. 1 is a perspective view of an example of a control mechanism of and a circuit for an electronic shutter embodying the present invention; and FIG. 2 through FIG. 4 show side views of an embodiment of the present invention, FIG. 2 showing the state in which the shutter is released, FIG. 3 showing the state in which the shutter is wound up, and FIG. 4 showing the state in which the mirror is retracted and the shutter is in operation.

Referring to FIG. 1, 1 and 1' are a pair of belts or strings connected to the front screen of a focal plane shutter, and 2 and 3 are pulleys for wrapping and unwrapping the belts thereabout. A lever 4 is provided with a contact 5 at one end thereof. 6 is a winding gear and 7 is a starting cam. The elements or members 1 through 7 are fixed to a shaft 8, and the shaft is rotatably mounted and extends through the spaced bearings 9 and 10. 11 is a rear screen related to a rear drum 12 which is rotatably mounted on the shaft 8. 13 is a rear screen pawl and 14 is a drum stopping lever, the pawl and lever being made as a unitary structure rotatably mounted about the shaft 8. A pin 15 is provided at the end of the drum stopping lever 14, and is positioned to face a pin 16 on the drum 12. 17 is a rear screen controlling lever which moves in unison with a shaft 18, the shaft being rotatably supported in the spaced bearings 19 and 20. The shaft is biased by a spring 21 whereby the lever 17 is urged in a counter-clockwise direction. One end of the rear screen controlling lever 17 has a hooked portion 17a which is located to face the rear screen pawl 13, and the other end of the lever has a magnetic element 22 connected thereto by a pin 23. An electromagnet 24 is mounted on the camera body. A lever 25 having a pair of arms is rotatably mounted on the shaft 18. One arm of the lever is provided with a contact 26. As shown in FIG. 1, the upstanding portion of the lever 25 has a lug 27 connected thereto to which a conductor is connected, the other end of which is connected to the timing circuit. A spring 28 is connected to the lever 25 as shown to urge the lever in a counter-clockwise direction against lever 73 extending upward from the rear screen controlling lever 17. A start hook 29 is mounted on a shaft 30. A spring 31 is connected to the start hook to urge the hook in a counter-clockwise direction. The start hook locks the starting cam 7 when the cam is in the wound up state. A shutter release button 32 has a spring 33 related thereto to resiliently urge the button toward its non-release position. Interlocking levers 34 and 35 are rotatably mounted in the spaced bearings 37 and 38 so that the interlocking levers may be rotated together with the shaft 36 upon which they are mounted. The interlocking lever 34 is cooperable with a pin 39 on the release button shaft 32, and the interlocking lever 35 is cooperable with a pin 41 provided on a release lever 40.

FIG. 2 shows a mirror driving mechanism and a switch 60 (also shown in FIG. 1) for shutting off or applying current from the electrical source or battery to the electromagnet 24 of the electronic shutter control circuit generally represented by the transistors $T_1$ and $T_2$, resistor R and condenser C, as shown in FIG. 1. FIG. 2 also shows the state of the mechanism in which the shutter is in released position. A retractable reflecting mirror 42 is rotatably mounted upon a shaft 43 and a spring (not shown) biases the mirror in a manner known in the art. A pin 44 is related to a supporting plate 45 for the mirror, the pin projecting out of the wall through an opening in the mirror box 46. A driving lever or member 47 is rotatably mounted upon a shaft 48. As shown, the drive lever has three arms 47a, 47b and 47c. The arm 47a is positioned to face the pin 44. The drive lever 47 is connected to a link 49, such link being connected to a link 51 which is rotatably mounted upon a shaft 50. A mirror driving spring 52 is mounted at its base upon a fixed shaft 53. As shown, the spring 52 is bifurcated and has two arms 52a and 52b which cross over each other a short distance above the mounting shaft 53 for the spring. The end of the spring arm 52a is in contact with a pin 54 on the link 51. The end of the spring arm 52b is connected to a pin 58 extending from a charge lever 57 by a connecting wire 55. The charge lever 57 is rotatably mounted upon a shaft 56. The arm 47b of the drive lever 47 is provided with a pin which is covered by an electrically insulating jacket or cylinder 59. The insulating cylinder is positioned to press against one of the contact members of the switch 60. As shown, the switch 60 comprises a pair of contact members, with one of the contact members longer than and spaced from the other so that the switch normally remains in open condition. The arm 47b of the drive lever also is provided with a concave portion 47b' against which the start hook 40 (also shown in FIG. 1) abuts to prevent clockwise rotation of the drive lever 47. A shutter release lever 61 is rotatably mounted on a shaft 62. A pin 63 is provided at the end portion of the shutter release lever 61 for cooperation with the arm 47c of the drive lever. A pin 64 on the other end of the shutter release lever is positioned to cooperate with the bent up portion 29a of the starting hook 29 as shown in FIG. 1.

The described mechanism operates as follows. The compressed energy stored in the two arms 52a and 52b of the mirror driving spring by the cooperable retaining pins 54 and 55 on the link 51 and the charge lever 57, respectively, provides a force which tends to reduce the gap between the two spring arms and urges the charge lever for rotation in a counter-clockwise direction; the pin 54 is urged toward the right in the showing of FIG. 2. The rotation of the charge lever 57 in a counter-clockwise direction acts to transmit a force to a convex portion 66 on the drive lever 47, thereby causing the link 51 to rotate in a clockwise direction through the intermediate link 49. The rotation of the link 51 is caused by the force imparted to the pin 54 by the mirror driving spring arm 52a, and such force is transmitted by the link 49 in an opposite direction. However, the rotation caused by the spring arm is superior so that rotation in a clockwise direction is imparted to the drive lever 47.

The movement as a whole is limited by a pin 67 provided on the wall of the mirror box, and in this state the switch 60 is open (see FIG. 2).

Next, the winding up of the shutter is carried out by turning the gear 6 in the counter clockwise direction. As previously described, the pulleys 2 and 3 and the lever 4 are fixed on the shaft 8. This permits the rear screen pawl 13 and the drum stopping lever 14 to rotate in the counter clockwise direction along with the gear 6 by means of the end portion 2a' of the groove 2a of the front screen pulley 2. The drum 12 is rotated in the counter clockwise direction along with the gear 6 by the connection of the pin 15 and the pin 16, and the rear screen pawl 13 and the drum stopping lever 14 and the drum 12 are retained at the position shown in FIG. 1 by means of the starting hook 29.

On the other hand, in regard to the mirror elevating mechanism, as shown in FIGS. 2 and 3, the lever 68, which is shown in section, is interlocked to the winding movement of the shutter and moves in the direction shown by an arrow in FIG. 2. The lever 68 rotates the charge lever 57 until it is stopped on the end 69a of the stop lever 69, shown in FIG. 3, while tensing the drive spring 52. The stop lever 69 is biased to rotate in the clockwise direction round the shaft 71 by means of the spring 70, and is stopped by pin 72 (See FIG. 1). The charge lever 57 comes on the left side of the stop lever 69 and is stopped at the end 69a. When the charge lever 57 is stopped at the end 69a thereof, the drive lever 47 is urged to rotate in the clockwise direction, but is stopped by the release lever 40. In this case, the switch 60 remains open. FIG. 3 shows this state, namely, the switch 60 remains open after the winding up of the shutter as it was before the winding.

Next, when the release button 32 is pushed in the direction as shown by the arrow in FIG. 1, the release lever 40 is rotated so that the release lever is lifted out of engagement with the concave portion of the arm 47b, thereby allowing the drive lever 47 to commence its clockwise rotation due to the force accumulated in the mirror driving spring 52 as transmitted to the drive lever through the links 49 and 51. As shown in FIG. 4, as the release lever 40 is lifted, the switch 60 is closed, and the mirror 42 is now in the state where it is retracted out of the light path of the camera lens. The arm 47c of the drive lever 47 pushes the pin 63 (see also FIG. 1) away from the starting hook 29 in the final stage of rotation of the lever 47, whereby the hook 29 is disengaged from the starting cam 7. This action commences the running of the shutter, that is, the opening and closing of the shutter as it is being released. When the shutter is wound up, the contact 5 engages the contact 26, and the lever 25 is rotated slightly in a clockwise direction. Since the spring 28 is stronger than the spring 21, the rear screen controlling lever 17 also is rotated in a clockwise direction, thereby causing the engagement and contact between the magnetic piece or armature 22 with the electromagnet 24.

As described above, the switch 60 is closed before the start hook 29 releases the cam 7 so that the transistor $T_1$ becomes conductive so as to pass a current through the electromagnet 24 to attract the magnetic piece 22. When the start hook 29 releases the cam 7, the front screen system 2, 3 and 4 starts rotation.

When the element 4 is rotated, 25 is also rotated, but it is stopped on the pin 73 on the rear screen controlling lever 17, and the effect of the spring 28 is lost. The lever 17 is rotated in the counter clockwise direction of the spring 21, but the piece 22 is attracted by the magnet 24 so that the rear screen system 12, 13 and 14 is stopped by the hook portion 17a. When the lever 25 is stopped on the pin 73, the contacts 5 and 26 open so that the condenser begins to be charged through the resistance R. The resistance of the resister R can be of the type that can be controlled manually, or of the type the resistance of which changes automatically as the function of the intensity of the ambient light. When the voltage of the condenser C reaches a predetermined value, the transistor $T_2$ becomes conductive and the transistor $T_1$ is turned off, and the attraction of the magnet is lost. As a result, the rear screen controlling lever 17 rotates in the counter clockwise direction, and the rear screen system 12, 13, and 14 runs to close the opening of the view. The pin 74 on the cam 13 hits the staged portion 69b of the lever 69 at the end of the closing process. This causes the arm 69a and the lever 57 to become disengaged, and the drive lever 47 to rotate in the counter-clockwise direction, lower and restore the mirror 42 again in the state shown in FIG. 2. Consequently, the switch 60 opens, and the supply of electricity into the magnet controlling circuit is terminated.

In accordance with the invention, the use of the battery or the electric power source by the shutter is minimized. Upon the release of pressure on the release button during the operation of the shutter at a slow shutter speed, normal operation may be attained.

In accordance with the invention, the camera structure is significantly simplified by the described relationship and operation of the switch 60 as related to the driving lever 47 of the driving mechanism for the mirror 42.

Even when a special wide angle lens is used, and while the mirror is retracted in a manner known to those skilled in the art, the driving lever makes the same described movement, and the shutter may be operated normally to furnish mirror-up photography.

What is claimed is:

1. A shutter actuating device for a single lens reflex camera having a shutter successively movable to open and closed positions defining an exposure sequence, a timing circuit including an electromagnet for releasably holding the shutter to control the exposure sequence, the device comprising a reflecting mirror normally biased toward a viewing position and movable between a viewing position and a photo-taking position, a driving mechanism for raising the mirror to photo-taking position and retracting the mirror to viewing position, the driving mechanism including a driving member engageable with the mirror and movable between a first position in which the driving member disengages from the mirror which is in the viewing position and a second position in which the driving member raises the mirror to the photo-taking position against the biasing force, a switch adapted to actuate the timing circuit disposed in the path of movement of said driving member, said switch being opened by the driving member in the first position and closed when the driving member starts movement toward the second position, means for releasably holding the shutter in closed position including a shutter release member in the path of movement of said driving member, whereby the shutter is opened after the mirror has been raised to photo-taking position, the timing circuit maintaining the electromagnet in an energized condition for a predetermined time, means responsive to the de-energization of the electromagnet for releasing the shutter to end the exposure sequence, and manually operable means for releasably holding said driving mechanism to allow placement of the mirror in a raised position prior to actuation of the shutter.

2. A photographic camera comprising a housing having a lens in the front, a focal plane shutter and an intermediate reflecting mirror pivotally mounted within the housing, means for positioning the reflecting mirror in the path of light coming through the lens for viewing an object and for raising the mirror out of the path of light, means for winding the shutter, a timing circuit including an electromagnet, an electric current source for energizing the timing circuit, a switch interposed between the timing circuit and the electric current source, means for retaining the shutter in wound condition and the switch in open state, means for releasing the shutter to the open position, means for releasing the shutter to the closed position, means for closing the switch in response to the release of the shutter independently of the upward movement of the mirror, whereby electric current is applied to the timing circuit and the electromagnet is energized, the timing circuit maintaining the electromagnet in an energized condition for a predetermined time, and means responsive to the de-energization of the electromagnet for actuating the means for releasing the shutter to the closed position.

3. A shutter actuating device for a single lens reflex camera having a shutter successively movable to open and closed positions defining an exposure sequence, a timing circuit including an electromagnet for releasably holding the shutter to control the exposure sequence, the device comprising a reflecting mirror normally biased toward a viewing position and movable between a viewing position and a photo-taking position, a driving mechanism for raising the mirror to photo-taking position and retracting the mirror to viewing position, the driving mechanism including a driving member engageable with the mirror and movable between a first position in which the driving member disengages from the mirror which is in the viewing position and a second position in which the driving member raises the mirror to the photo-taking position against the biasing force, a switch adapted to actuate the timing circuit disposed in the path of movement of said driving member, said switch being opened by the driving member in the first position and closed when the driving member starts movement toward the second position, means for releasably holding the shutter in the closed position including a shutter release member in the path of movement of said driving member, whereby the shutter is opened after the mirror has been raised to photo-taking position, the driving member having three arms, the first arm being related to the mirror for raising and retracting the mirror, and the second and third arms being engageable with said switch and shutter release member, respectively, and manually operable means for releasably holding said driving mechanism to allow placement of the mirror in a raised position prior to actuation of the shutter.

* * * * *